J. L. GRAHAM.
FRICTION GEARING.
APPLICATION FILED JUNE 1, 1908.
940,006.
Patented Nov. 16, 1909.
2 SHEETS—SHEET 2.
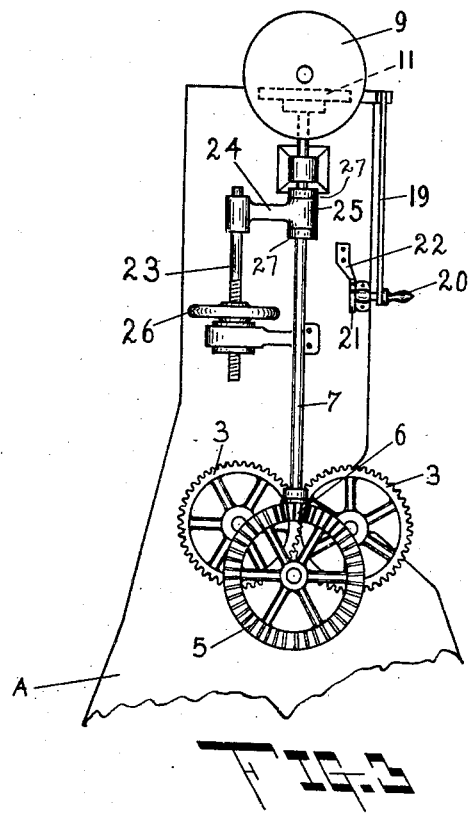
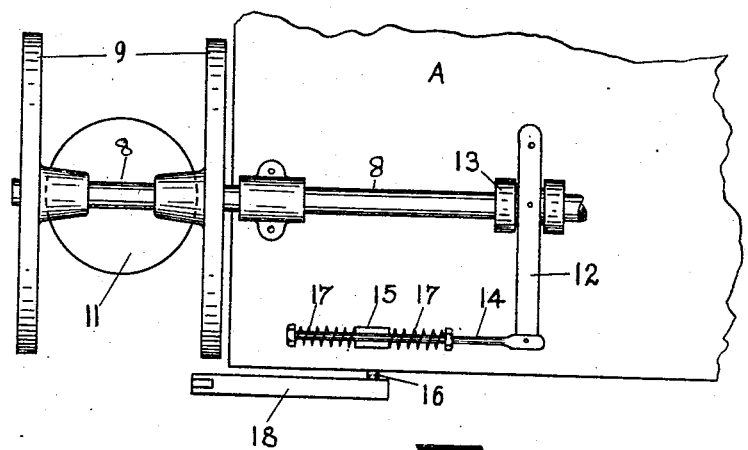
WITNESSES:
J. Ray Abbey
Ralph S. Warfield
INVENTOR
John L Graham
BY
Geo. B. Willcox
ATTORNEY

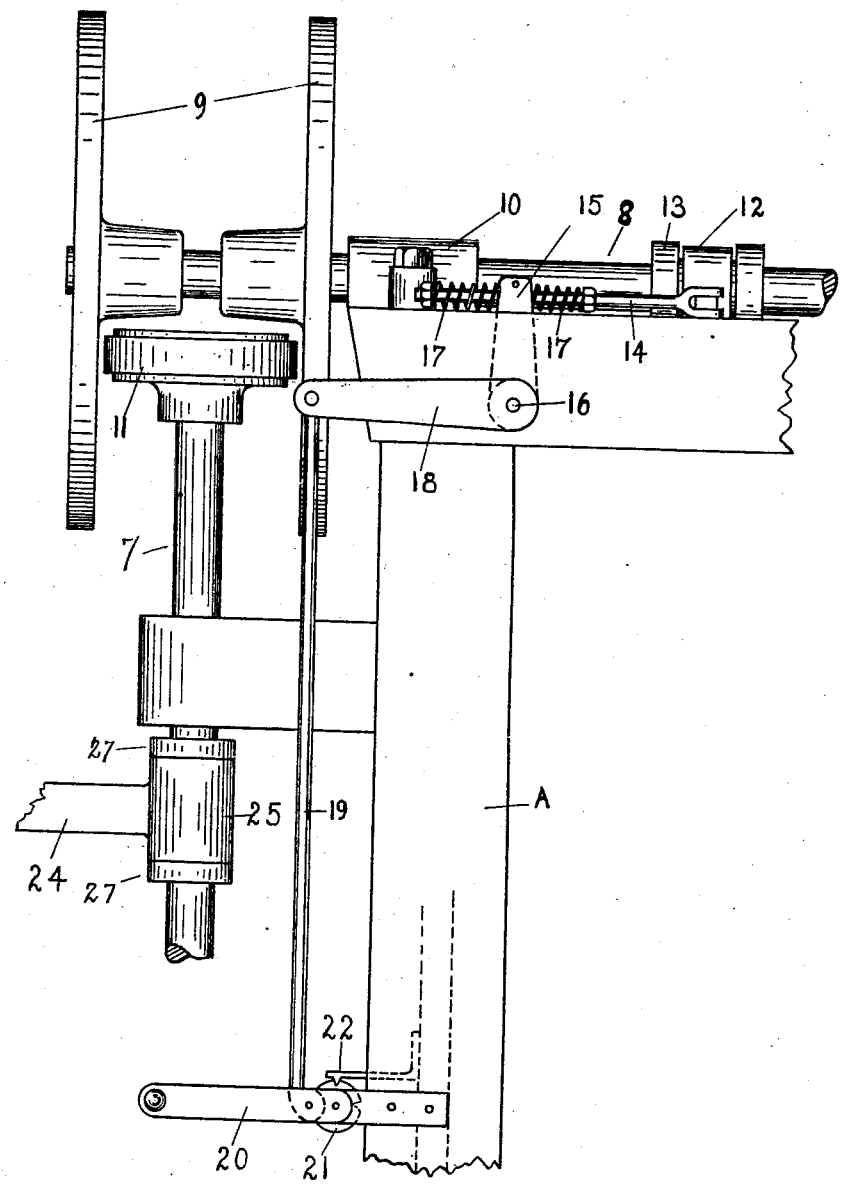

UNITED STATES PATENT OFFICE.

JOHN L. GRAHAM, OF REYNOLDSVILLE, PENNSYLVANIA, ASSIGNOR TO WICKES BROTHERS, OF SAGINAW, MICHIGAN, A CORPORATION OF MICHIGAN.

FRICTION-GEARING.

940,006.    Specification of Letters Patent.    Patented Nov. 16, 1909.

Application filed June 1, 1908.   Serial No. 435,902.

*To all whom it may concern:*

Be it known that I, JOHN L. GRAHAM, a citizen of the United States, residing at Reynoldsville, in the county of Jefferson and State of Pennsylvania, have invented certain new and useful Improvements in Friction-Gearing; and I do hereby declare the following to be a full, clear, and exact description of the invention, such as will enable others skilled in the art to which it appertains to make and use the same.

My invention relates to friction gearing for gang saws.

One object is to provide means for instantly reversing the feed of the timber to the saws.

Another object is to provide means for avoiding the splashing of lubricant on to the friction driving surfaces.

A further object is to provide a construction wherein the friction wheel is keyed to its shaft so that it can be faced to fit perfectly true against the friction disks.

Heretofore it has been customary to provide a single friction disk. The friction wheel was feathered on its shaft and means provided to move the wheel relative to the disk. In the first place, the stroke of a gang saw is very rapid and in cases where it was desirable to reverse the feed to move the timber away from the saws, it was necessary to rotate a hand wheel which controlled the position of the wheel relative to the friction disk to move the wheel across the center of the friction disk. This takes so much time that the saw will make a great many strokes before the feed could be reversed so that any damage to the saws will have happened before the reversal of the feed. Secondly, in the old form it was necessary to have a lubricated bearing at the point of connection of the friction wheel and its adjusting means. It was difficult to lubricate such bearing and the lubricant was splashed or thrown by centrifugal action against the face of the friction disk, thereby greatly impairing the efficiency of the drive. Thirdly, the necessity for feathering the friction wheel on its shaft caused the wheel to wabble and resulted in a poor contact surface between the disk and wheel.

To avoid these and other disadvantages, I have provided the following construction as one exemplification of my invention, which consists in certain novel features and combinations such as will be more fully described hereinafter and particularly set forth in the claims.

In the accompanying drawings Figure 1 is a front view of my invention applied to a gang. Fig. 2 is a top plan view, and Fig. 3 is a side view.

A, indicates the frame of a gang equipped with a gang saw, not shown. Journaled in the frame are the feed rolls rotated by the gears (3), (3). The gears are driven by a pinion actuated by a gear (5). A suitably supported pinion (6) slidably connected with a vertically extending slidable counter shaft (7) is in mesh with the gear (5). The rotation of the shaft (7) in one direction or the other will feed the timber toward or from the saws.

As one means for rotating the counter shaft I may provide the following construction: A suitably actuated drive shaft (8) rotated in one direction, may be conveniently journaled on the cornice of the gang. The drive shaft extends beyond the cornice and its projecting end is equipped with a pair of friction disks, (9), (9), spaced apart from each other and fixed on the shaft. A friction wheel (11) is received in the space between the disks. It is obvious that the wheel may be moved relative to the disks to engage one or the other or that the disks may be movably mounted relative to the wheel. As a preferred construction, the drive shaft is made longitudinally slidable in its bearings, (10), and the upper end of the counter shaft (7) projects between the adjacent faces of the friction disks (9), (9), and carries a friction wheel (11) fixedly secured thereto. One or the other of the friction disks may be caused to engage the friction wheel to reverse the feed by means of a single hand lever connected by linkage to the shaft. As one such construction, I may provide the following mechanism:

A lever (12) suitably pivoted at one end to the frame engages a collar (13) carried by the drive shaft (8). The opposite end of the lever is pivotally connected to a rod (14) extending parallel with the drive shaft.

This rod passes through the free end of an arm (15) secured to a stub shaft (16) journaled in the frame. Springs (17), (17) encircle the rod on opposite sides of the arm (15), the springs bearing against the free end of the arm and operate as a centering device to normally maintain both of the disks (9) out of contact with the wheel (11). The springs are each strong enough, however, to overcome the jarring and vibration of the machine which might tend to release either disk from contact with the wheel when in contact therewith. The springs also tend to maintain the disk and wheel in yielding contact when the friction surface has become worn.

A crank (18) is secured to the shaft (16), a link (19), connecting the crank with a hand lever (20), pivotally connected near one end to the frame. The link is pivotally secured to the hand lever and its pivotal point is movable around the pivotal point of the hand lever as a center. The hand lever has three positions. When in its horizontal or intermediate position (shown in the drawing) it maintains both friction disks out of contact with the friction wheel. When the lever is thrown upwardly, it will force the crank (18) upward to throw the arm (15) and through the arm, the rod (14), lever (12) and shaft (8) toward the right (in the drawings) to bring the outer disk (9) into contact with the wheel (11), thereby starting the feed in one direction. When the hand lever is moved to its opposite extreme position, the feed will be reversed. As one means for retaining the hand lever in any of its adjusted positions, I may notch the hub (21) of the lever and provide a spring detent (22), the free end of which is received in any one of the respective notches.

From the foregoing it is obvious that in case the sawyer apprehends damage to the saw, he has only to throw the hand lever (20), from one extreme position to the other. This operates to slide the drive shaft (8) endwise to move one disk (9) out of contact with the wheel (11) and bring the remaining disk into contact with the wheel, thereby instantly reversing the direction of the feed of the timber by the rolls. It will be noticed that the direction of feed is controlled by a single lever.

The friction disks and wheel are fixed to their respective shafts and can be trued up to make a full contact with each other, nor is there any possibility of the wheel or disks wabbling on their shafts.

Means, such as an adjustable rod (23), controlled by a hand wheel (26), and an arm (24) connecting the rod and counter shaft (7), is provided to shift the position of the friction wheel (11) relative to the friction disks (9). This is accomplished by making the countershaft slidable relative to the gear 6, the countershaft being slidably connected to the gear in any convenient manner. That end of the arm journaled on the countershaft is received between the collars 27, 27 to enable the arm to shift the countershaft.

The counter shaft (7), rotates in the bearing (25) at the juncture of the arm (24) and countershaft. It will be observed that the bearing is located remote from the friction disks, and in position to be easily lubricated, nor can the lubricant from the bearing be thrown or spattered on to the contact surfaces of the friction drive mechanism.

Having thus fully disclosed my invention, what I claim as new is:

1. In a reversing mechanism, the combination with a drive shaft, friction disks mounted thereon and spaced apart from each other, a longitudinally movable countershaft, a friction wheel fixedly mounted thereon, and means for engaging one or the other of the friction disks with the wheel, of a longitudinally adjustable rod lying substantially parallel with the countershaft, an arm, one end of which is secured to the rod, the opposite end of the arm journaled on the countershaft at a point remote from the friction surfaces, and means carried by the countershaft and located on opposite sides of the arm to permit the latter to shift the countershaft.

2. In a reversing mechanism, the combination with a countershaft, a friction wheel thereon, a drive shaft, and friction disks carried by the drive shaft, the friction wheel received between the disks, of a lever adapted to shift the disks, a longitudinally movable rod connected to the lever, a swinging arm engaging he rod, a crank for actuating the arm, a hand lever, and a link connecting the hand lever and crank.

3. In a reversing mechanism, the combination with a countershaft, a friction wheel thereon, a drive shaft, and friction disks carried by the drive shaft, the friction wheel received between the disks, of a lever adapted to shift the disks, a longitudinally movable rod connected to the lever, a swinging arm, the rod passing loosely through the arm, springs mounted on the rod on opposite sides of and abutting the arm, a crank for actuating the arm, a hand lever, and a link connecting the crank and hand lever.

4. The combination with a countershaft, a friction wheel thereon, slidably supported opposed friction disks between which the friction wheel is received, and a lever for shifting the disks, of a rod connected to the lever, a swinging arm for actuating the rod, means engaging the arm for normally retaining the latter in its intermediate position, a rotatably supported notched hub, a hand lever for actuating the hub, a linkage connecting the hand lever and the arm, and a detent yieldingly engaging one of the notches in the hub to retain the arm in one or the other of its positions.

5. In a reversing mechanism, the combination with a pair of shafts, a friction wheel on one shaft, a pair of friction disks on the remaining shaft, and a lever adapted to cause the engagement of one or the other of the friction disks with the wheel, of a swinging arm, a centering device connecting the arm and lever, and means for actuating the arm.

In testimony whereof I affix my signature in presence of two witnesses.

JOHN L. GRAHAM.

Witnesses:
S. P. CORBETT,
J. H. CORBETT.